S. J. RENNER.
APPLE CORER AND QUARTERER.
No. 188,819. Patented March 27, 1877.
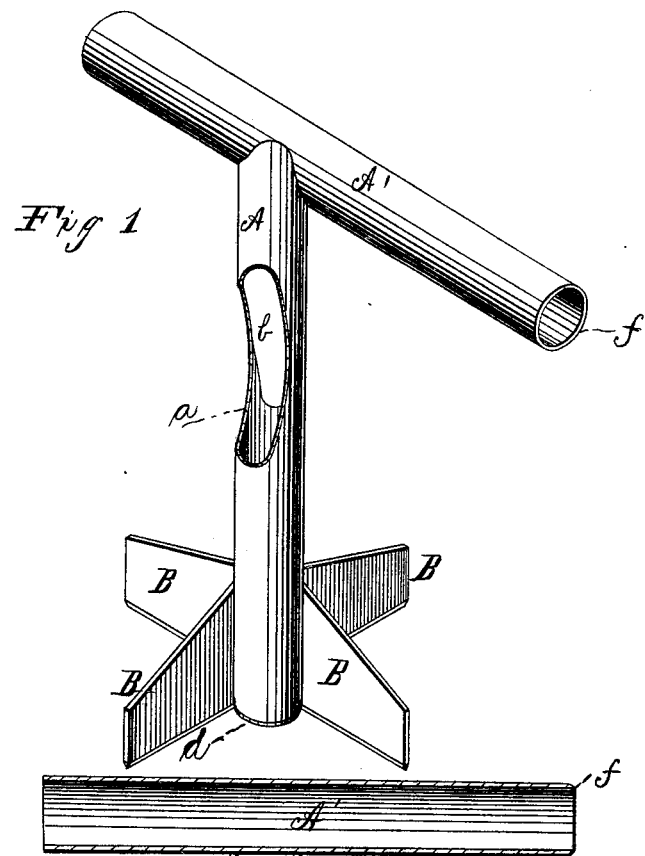
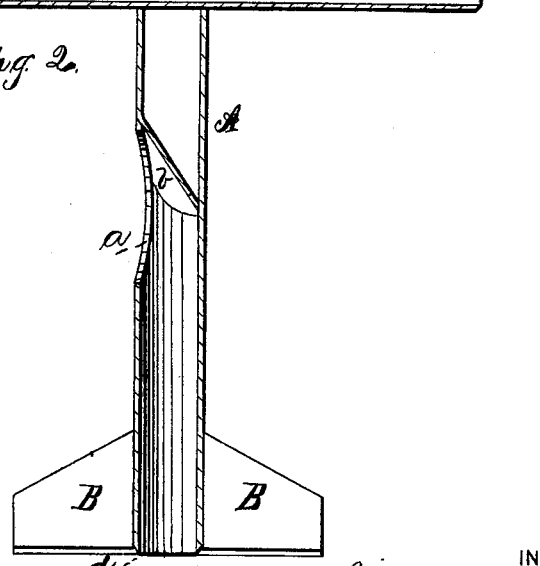
WITNESSES
Harry Aubrey Toulmin
F. L. Durand
INVENTOR
S. Jennie Renner

UNITED STATES PATENT OFFICE.

S. JENNIE RENNER, OF PETERSBURG, PENNSYLVANIA.

IMPROVEMENT IN APPLE CORER AND QUARTERER.

Specification forming part of Letters Patent No. 188,819, dated March 27, 1877; application filed September 9, 1876.

*To all whom it may concern:*

Be it known that I, S. JENNIE RENNER, of Petersburg, in the county of Huntingdon, and in the State of Pennsylvania, have invented certain new and useful Improvements in Apple Corer and Quarterer; and do hereby declare that the following is a full, clear, and exact description thereof, reference being had to the accompanying drawings, and to the letters of reference marked thereon, making a part of this specification.

The nature of my invention consists in the construction of a device for taking the cores out of and cutting apples into quarters, as is hereinafter more fully set forth.

In the accompanying drawings, which form part of this specification, Figure 1 represents a perspective view, and Fig. 2 a sectional view, of my invention.

A represents a vertical metal tube, having its lower end $d$ formed with a cutting-edge. Upon one side of the tube is an opening, $a$, above which is an inclined plate, $b$, as shown. Attached to the bottom of the tube A are a series of (four or more) cutting-wings, B B, placed equidistant, and upon the top of said tube is secured another tube, A', attached at right angles to the tube A. The tube A' has also a cutting-edge, $f$, at one end, and is slightly tapered, as shown. This tube is used for taking out apple-cores by forcing the same down through the center of the apple, so that the core will pass into the tube, and be withdrawn through the open and enlarged end of the same. In coring and quartering the apple at the same time, the tube A' acts as a handle, and by pressing the tube A the cutting-edge at its bottom will core the apple, while the wings B will quarter it at the same time. The core will pass up into the tube, and, striking the incline $b$, will pass out through the side slot $a$. In use, the tube A acts as a handle when the tube A' is coring the apple, and when tube A is cutting and coring the apple, tube A' acts as a handle for the same.

The device is easily and cheaply made, and will perfectly perform its functions.

Having thus fully described my invention, what I claim is—

The combination of the tapering tube A', the tube A, with slot $a$, and wings B, both of said tubes having cutting-edges $f$ $d$ at their ends, as set forth.

In testimony that I claim the foregoing I have hereunto set my hand this 24th day of August, 1876.

S. JENNIE RENNER.

Witnesses:
OWEN BRUNER,
JACOB BRUNER.